United States Patent
Perreault

[15] 3,704,918
[45] Dec. 5, 1972

[54] ENDLESS TRACK
[72] Inventor: Jules Perreault, Sherbrooke, Quebec, Canada
[73] Assignee: Bombardier Limited, Valcourt, Quebec, Canada
[22] Filed: Jan. 22, 1970
[21] Appl. No.: 4,896

[52] U.S. Cl. .................................................305/38
[51] Int. Cl. ............................................B62d 55/24
[58] Field of Search .......305/35, 37, 38, 54; 152/209

[56] References Cited

UNITED STATES PATENTS

| | | | |
|---|---|---|---|
| 3,582,154 | 6/1971 | Russ | 305/35 EB |
| 2,109,691 | 3/1938 | D'Ayguesvives | 152/209 |
| 3,000,421 | 9/1961 | Hack | 152/209 |

FOREIGN PATENTS OR APPLICATIONS 256,796  8/1926  Great Britain................305/35 EB Primary Examiner—Richard J. Johnson
Attorney—Larson, Taylor and Hinds

[57] ABSTRACT

An improved endless track for use on track laying vehicles particularly snowmobiles, the track consists of an endless belt of rubber or the like with a large number of transverse traction ribs whose active faces present an elongated planar surface at an angle with respect to the normal to the plane of the endless belt.

7 Claims, 2 Drawing Figures

PATENTED DEC 5 1972

3,704,918

ENDLESS TRACK

INTRODUCTION

The present invention relates to endless tracks as used for supporting and providing traction to track laying vehicles of relatively small sizes but capable of substantial speeds over various ground conditions, and such tracks are particularly well suited to modern day snowmobiles.

PRIOR ART

Conventional snowmobile tracks often consist of a relatively wide endless belt of elastomeric material with flexible longitudinal reinforcements such as layers of fabric, and transverse reinforcing rigid members such as metallic rods or the like, and a series of transverse traction ribs of predetermined cross-sectional shape. Series of tooth sprocket holes are also provided for engagement by driving and idler sprocket wheels. The purpose of the ribs which are normally superimposed upon the transverse reinforcing members are intented to provide traction to the track especially when used on soft slippery surfaces such as snow. One such track construction is disclosed in Canadian Pat. No. 605317 dated Sept. 20, 1960, to which corresponds U.S. Pat No. 2,899,242 dated Aug. 11, 1959.

OBJECT OF THE INVENTION

The object of the present invention is to provide an endless track which enables superior traction over slippery surfaces without necessarily adding to the weight or cost of conventional endless tracks.

STATEMENT OF INVENTION

The above noted object can be achieved by providing an endless track made of a suitable endless belt of elastomeric material wherein the active faces of the traction ribs or formations which extend transversely of the treading surface of the endless belt essentially comprise an elongated planar surface disposed at an angle with respect to the normal to the adjacent section of the endless belt.

In particular, the invention provides a unidirectional endless track wherein the inactive face of each traction formation is perpendicular to the plane of the adjacent section of the endless belt, whereas the angle of the elongated planar surface of each active face is of the order of 45 degrees.

In a particular embodiment in accordance with this invention, the traction formations which are evenly distributed along the length of the belt are identical to one another and of constant cross-section, and are formed integrally with said endless belt.

Preferably, the faces of each formation are joined to one another by a rounded edge and each face of the traction formations meets the plane of the endless belt along concavely rounded edges.

LIST OF DRAWINGS

An exemplary embodiment of the present invention is illustrated in the accompanying drawings wherein FIG. 1 is a partial perspective view of an endless track, and FIG. 2 is a cross-sectional view of a portion of a track taken along line 2—2 of FIG. 1.

DESCRIPTION OF A PREFERRED EMBODIMENT

Figure 1:
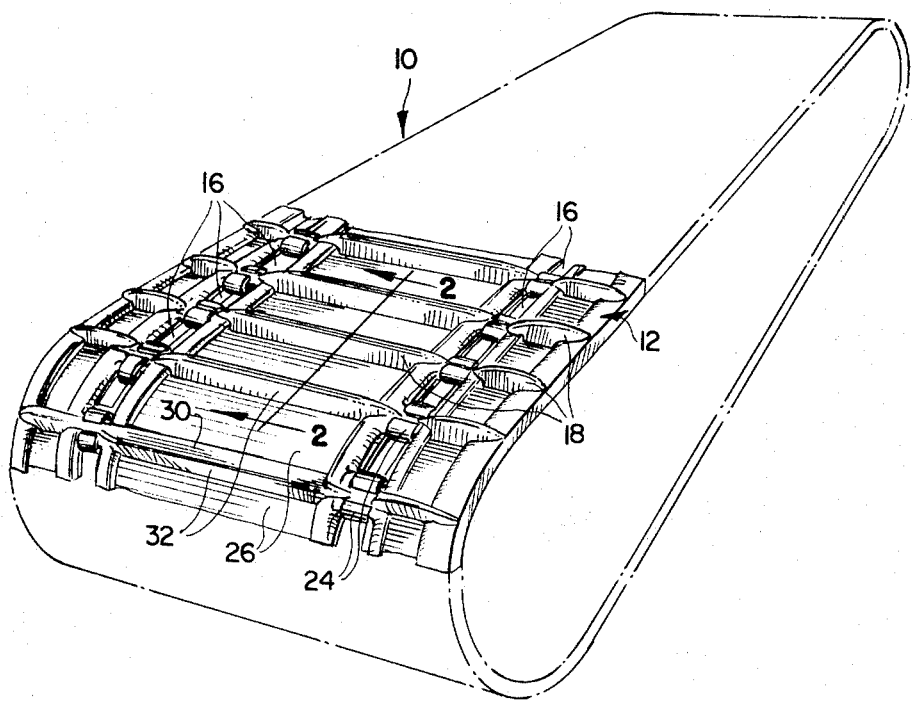
Figure 2:
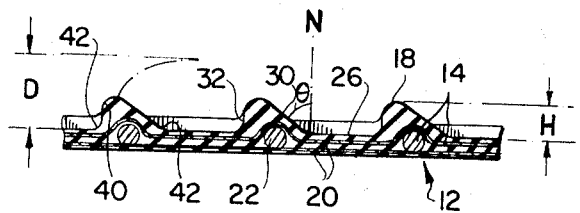

In the accompanying drawings, an endless track is shown which is referred to generally by reference numeral 10. Track 10 comprises an endless belt 12 made of an elastomeric material and incorporating reinforcing means 14, driving member engaging means 16, and on its trading surface a plurality of transversely extending ribs or traction formations 18.

The elastomeric material of which endless belt 12 is made is normally rubber although certain plastic materials have been successfully used in recent years. With rubber however, reinforcing means 14 comprises one or more layers of inextensible material 20 embedded in endless belt 12 and adapted to prevent undue stretching of the track when subjected to a substantial driving force. Reinforcing means 14 is also required to prevent transverse buckling of the track when used over rough grounds. This can be achieved by the use of relatively thick transverse ribs 18 but where it is desired to minimize the height of ribs 18 and the overall weight of the track, resort is had to rigid reinforcing members 22 disposed within endless belt 12. Reinforcing members 22 can be of various configurations such as round, flat etc, and the material used is normally spring steel.

In order to enable positive engagement of track 10 with driving sprocket wheels (not shown), driving member engaging means 16 is provided which, in the case of rubber tracks, consists of one or more rows of sprocket tooth engaging apertures 16. To facilitate penetration of the sprocket teeth in apertures 16, metallic inserts 24 may be secured to endless belt 12 between each successive apertures 16.

In operation, endless belt 12 is entrained around driving sprockets (not shown) at one end, idler sprockets (not shown) at the other end and load bearing means (not shown) which apply a major proportion of the vehicle's weight onto the ground engaging portion of endless belt 12. The driving sprockets drive the endless track 10 into rotation with respect of the vehicle on which it is mounted, and by reason of the frictional engagement of the treading surface of track 10 with the ground, the load bearing means move forwardly over the ground engaging portion of track 10 thus causing forward displacement of the vehicle.

Ribs 18 which are illustrated as a series of straight equally spaced apart transverse formations, are an essential component to tracks which can be called upon to be used over soft and/or slippery surfaces for example snow or ice-covered grounds. They are in fact universally used on snowmobile tracks although in different configurations and sizes. In operation, the forward end of the ground engaging portion of the endless track compresses the snow and each successive rib penetrates the snow. Due to the action of the driving train onto the endless track, each rib in contact with the ground urges the material immediately behind it towards the rear of the vehicle. Stated differently, the layer of snow which is penetrated by the ribs of the track is subjected to shear forces with the result that positive engagement of the track with the ground is obtained unless the driving force happens to exceed the reacting shear force of the ground at which time the snow "breaks" and slipping takes place.

Prior snowmobile tracks exhibited different configurations of traction ribs. Their transverse cross-section was often dictated by practical considerations such as ease of manufacture and kind of material used. One of the most widely used snowmobile tracks has ribs of semi-circular cross-section and another one presents a series of inverted U-shaped metallic cleats. The former type is known for its traction in soft snow whereas the latter which has the tendency of "breaking" in deep snow obviously meets more success where icy surfaces are more prevalent.

In accordance with this invention the active face of each ribs 18 essentially comprises an elongated narrow planar surface 30 disposed at an angle $\theta$ with respect to the normal N to the adjacent section of endless belt 12. With an inclined surface 30 it has been discovered that the layer of snow subjected to shear forces which was thought to be necessarily equal to the height H of the ribs could be increased to a value D depending on angle $\theta$ referred to above because the action of the active face of each rib on the adjacent soil is normal to the active face. Hence with too large an angle $\theta$ slipping is more likely to occur because the ribs would tend to "slide over" ground irregularities, nd and too small an angle $\theta$ the snow would tend to break on account of a thinner layer thereof being subjected to shear forces.

In a particular embodiment in accordance with this invention, angle $\theta$ is of the order of 45° although it has been found that depending on the snow conditions and the ground pressure exerted by the vehicle, angle $\theta$ may be varied substantially for optimum traction.

Since the weight of the endless track may contribute as much as 10 percent of the total weight of a snowmobile, it is important to eliminate all excess elastomeric material particularly in the transverse ribs. This invention accordingly provides a unidirectional endless track wherein the face 32 of each rib 18 opposite active face 30 is made perpendicular to the plane 26 of endless belt 12. In this manner the elastomeric material that would be required to fill the opposite side of each rib 18 is omitted without loss of traction provided of course the track is mounted with active faces 30 of the ground engaging portion facing rearwardly of the vehicle. It is also estimated that with one perpendicular side, ribs 18 can more easily penetrate packed snow. Furthermore, the edges of ribs 18 at the adjoining sides of surfaces 30 and 32 can be rounded as at 40 to minimize wear, facilitate the preparation of the forming molds and save a small amount of elastomeric material.

On the other hand, it is prefered to provide rounded edges where each face 30 and 32 meets the plane 26 of endless belt 12 as at 42, for the purpose of reducing the possibility of tearing or cracking of the elastomeric material.

Ribs 18 which are preferably of the same, constant cross-section can be interrupted at the rows of sprocket tooth receiving apertures 16 to facilitate and enable better crimping of inserts 24 onto the elastomeric material.

Although ribs 18 will normally be made integrally of the endless belt 12, especially in the case of tracks produced by molding, it should be realized that other modes of construction can be employed for making an endless track in accordance with this invention.

Good results have been obtained with a snowmobile endless track made of a one-piece molded rubber belt 12 having two rows of sprocket tooth receiving holes 16 and mild steel inserts 24 secured to belt 12 by crimping. The rubber belt 12 includes plies of Nylon 20 extending longitudinally of the belt and transverse spring steel rods 22 of a diameter of 7/32 inch embedded in the rubber belt 12. Rods 22 are disposed within transverse ribs 18 thereby extending through inserts 24 to the edge portions of the track. With a two-inch pitch the height of ribs 18 is 7/16 inch, the radius of edge 40 is 5/32 inch inch and the radius of edges 42 is ⅛ inch. The distance between rounded edges 42 should consequently be of the order of ⅝ inch.

To produce a molded rubber track 10 as illustrated in the accompanying drawings, a first layer of raw rubber is wound around a circular drum of a circumference equal to the desired length of the inside surface of the track, one of more layers of inextensible material preferably embedded in raw rubber are disposed over the first one, and rods 22 are placed over the top layer transversely of the drum and equally spaced apart at a distance corresponding to the desired pitch of the finished track. Then one or more layers of raw rubber with or without reinforcing inextensible fabric are wound on the drum over rods 22 until the desired thickness is obtained. Thereafter the drum with the raw rubber thereover are placed in a cylindrical mold for a combined pressure and heat treatment where curing to the final shape is effected.

I claim:

1. In combination, a small track-laying vehicle capable of travelling at a relatively high speed, said vehicle having a front and a rear, and a track unidirectionally mounted on the vehicle, said track comprising an endless belt of elastomeric material and incorporating reinforcing means adapted to resist longitudinal stretching of said endless belt and provide sufficient transverse rigidity in order to prevent undue buckling of said endless belt transversely of its length, said track being constructed to travel in a first direction when the vehicle is travelling forwardly, and driving member engaging means for enabling said endless belt to be driven into rotation in said first direction, said endless belt having on its treading surface a plurality of identical transversely extending traction formations equally spaced from one another along the length of said endless belt, the active face of each said traction formation, which is that face which faces rearwardly, relative to the direction of travel of the vehicle, when that traction formation contacts the ground, essentially comprising an elongated transversely extending rear planar surface disposed at an angle of the order 45 degrees with respect to the normal to the section of said endless belt adjacent to that traction formation, the other face of each said traction formations essentially comprising a forward planar surface normal to the said adjacent section of said endless belt, said active and opposite faces being terminated along their adjoining transversely extending sides by a transversely extending continuous rounded surface bridging the said forward and rear planar surfaces and forming the edge of said traction formation and wherein said forward and rear planar surfaces are tangent to said continuous rounded surfaces.

2. The invention of claim 1, said reinforcing means including a layer of inextensible material embedded into said endless belt to resist longitudinal stretching thereof.

3. The invention of claim 2, said reinforcing means further including rods extending transversely of the belt to prevent undue buckling of the belt.

4. The invention of claim 2, said driving member engaging means comprising a series of tooth receiving holes along the length of said endless belt for engaging with a drive sprocket wheel.

5. The invention of claim 2, said traction formations being spaced about said endless belt on a two inch pitch, and the height of each rib above the endless belt being of the order of ⅝ of an inch.

6. In combination, a small track-laying vehicle capable of travelling at a relatively high speed, said vehicle having a front and a rear, and a track unidirectionally mounted on the vehicle, said track comprising an endless belt of elastomeric material and incorporating reinforcing means adapted to resist longitudinal stretching of said endless belt and provide sufficient transverse rigidity in order to prevent undue buckling of said endless belt transversely of its length, the means for providing transverse rigidity comprising rods extending transversely across the belt, said track being constructed to travel in a first direction when the vehicle is travelling forwardly, and driving member engaging means for enabling said endless belt to be driven into rotation in said first direction, said endless belt having on its treading surface a plurality of identical transversely extending traction formations equally spaced from one another along the length of said endless belt, the active face of each said traction formation, which is that face which faces rearwardly, relative to the direction of travel of the vehicle, when that traction formation contacts the ground, essentially comprising an elongated transversely extending rear planar surface disposed at an angle of the order of 45 degrees with respect to the normal to the section of said endless belt adjacent to that traction formation, the other face of each said traction formations essentially comprising a forward planar surface normal to the said adjacent section of said endless belt, said active and opposite faces being terminated along their adjoining transversely extending sides by a transversely extending continuous rounded surface bridging the said forward and rear planar surfaces and forming the edge of said traction formation and wherein said forward and rear planar surfaces are tangent to said continuous rounded surfaces.

7. The invention of claim 6, each traction formation being disposed above one of said rods with at least a part of the cross section of the rod within the traction formation.

* * * * *